Sept. 3, 1963
R. L. SITTEL
3,102,734
VERTICALLY ADJUSTABLE TRAILER UNIT
Filed May 9, 1960
3 Sheets-Sheet 1
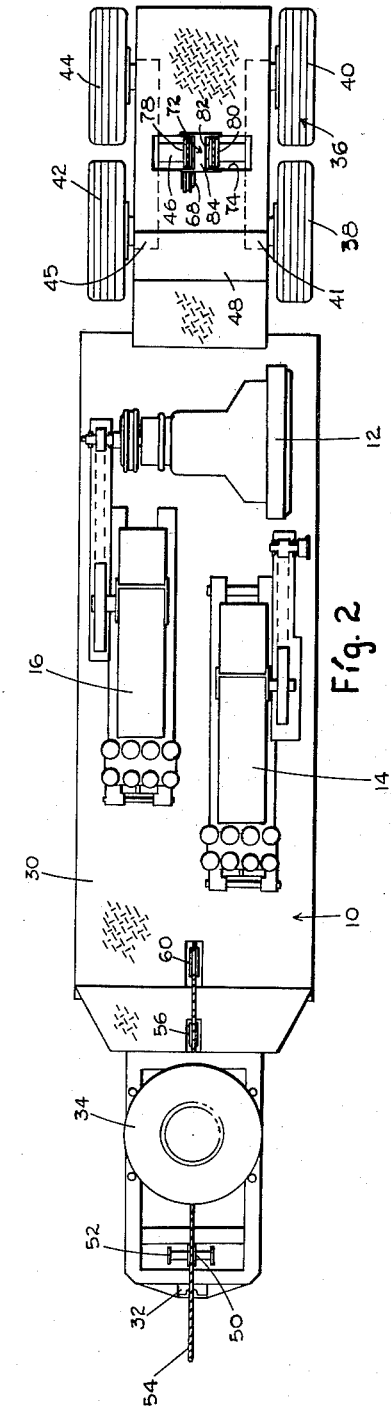
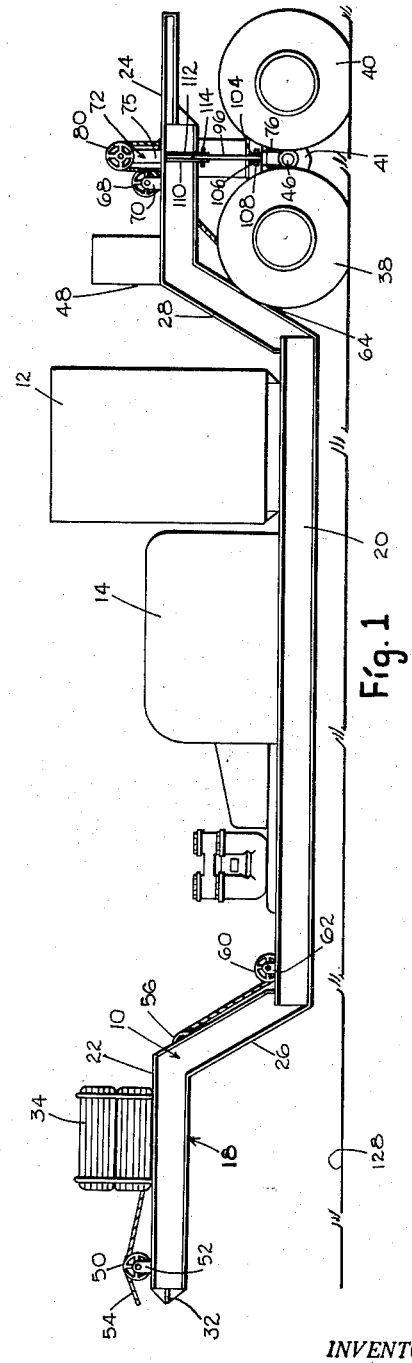
INVENTOR.
RICHARD L. SITTEL
BY Sept. 3, 1963   R. L. SITTEL   3,102,734
VERTICALLY ADJUSTABLE TRAILER UNIT
Filed May 9, 1960   3 Sheets-Sheet 2

*INVENTOR.*
RICHARD L. SITTEL
BY

Sept. 3, 1963 R. L. SITTEL 3,102,734
VERTICALLY ADJUSTABLE TRAILER UNIT
Filed May 9, 1960 3 Sheets-Sheet 3
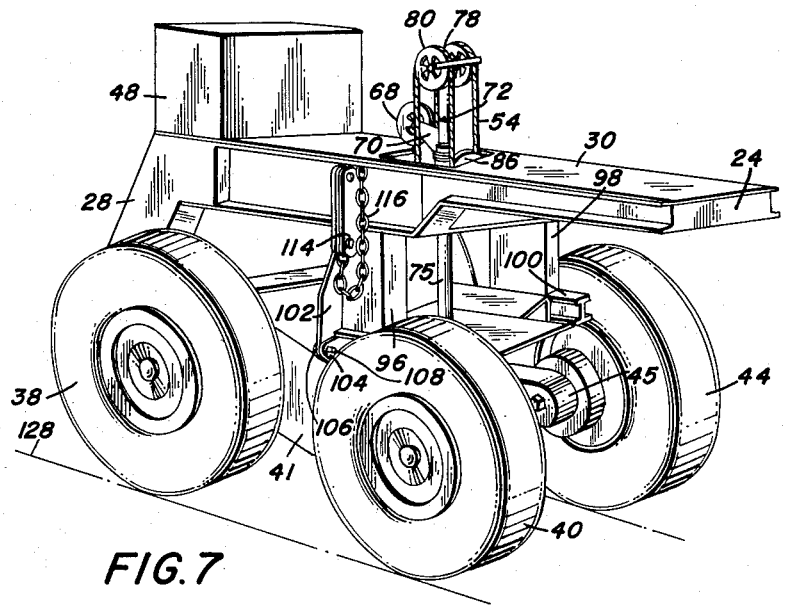
FIG. 7
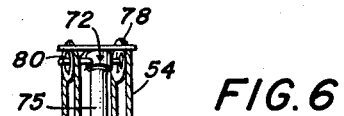
FIG. 6
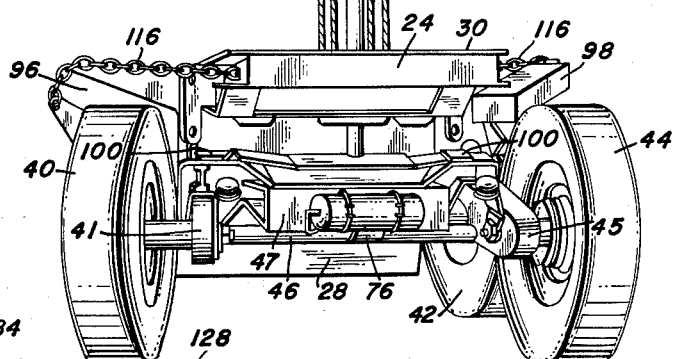
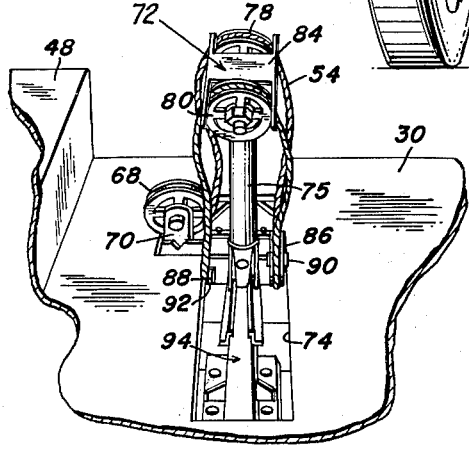
FIG. 8
INVENTOR
RICHARD L. SITTEL
BY William S. Dorman
ATTORNEY United States Patent Office 3,102,734
Patented Sept. 3, 1963

3,102,734
VERTICALLY ADJUSTABLE TRAILER UNIT
Richard L. Sittel, Tulsa, Okla., assignor to Unit Rig & Equipment Company, Tulsa, Okla., a corporation of Delaware
Filed May 9, 1960, Ser. No. 27,610
4 Claims. (Cl. 280—43.19)

This invention relates to improvements in truck mounted equipment, and more particularly, but not by way of limitation, to a tractor or truck trailer unit particularly designed and constructed for elevation during transportation thereof and lowering during utilization of the equipment mounted thereon.

Heavy equipment, such as pumps, engines, compressors, draw works, and the like, are normally utilized during the drilling of a well bore. However, much of this equipment is not necessary during the production from the well upon completion of the drilling operation. As a result, the heavy equipment is frequently mounted on a trailer unit adapted to be towed by a truck or tractor whereby the equipment may be transported from a completed well site to a second location wherein the equipment may be needed. Compressors, engines, pumps, and other heavy apparatus usually create considerable vibration during the operation thereof and thus require a substantial and stable base or foundation for the support thereof. In addition, it is desirable to locate the pumping equipment, and particularly suction type pumps, as close to the ground level as possible since the slush pit or sump is usually an excavation in the ground, and the least or minimum distance through which the mud or fluid must be elevated by the pump is desirable for a more efficient operation thereof. Thus, it is preferable to position the trailer mounted equipment as close to the ground surface as possible to provide for stabilization thereof, as well as for an increased operating efficiency. This presents a problem in that the trailer must also be sufficiently elevated from the ground to provide for road clearance during the transporting of the equipment.

The present invention contemplates a novel trailer unit generally similar to that disclosed in the D. M. Manning Patents No. 2,653,827 and No. 2,759,737, both entitled "Vertically Adjustable Truck Trailer," and is an improvement thereover. The novel trailer unit is particularly designed and constructed for supporting heavy equipment in such a manner that the equipment may be disposed substantially on the ground during the operation thereof, and yet may be elevated to provide for road clearance of the trailer during the transporting thereof from site to site. The novel trailer comprises a body portion or frame adapted to be lowered and raised as a unit with respect to a wheel unit or the running gear therefor by means of a hoisting apparatus. The trailer frame may be lowered whereby the central portion thereof will rest on the ground, thus providing a stable base or foundation for the operation of the compressors, pumps, engines and the like. When it is desired to transport the equipment to a new or different location, the frame may be raised with respect to the running gear in order to provide sufficient road clearance whereby the trailer may be moved along a highway or across the countryside. The frame or chassis of the trailer remains substantially horizontal in both the lowered and raised positions thereof, thereby permitting utilization of substantially the entire upper surfaces thereof for storage of equipment, and the like. Thus, the novel trailer provides the two-fold function of facilitating the portability of heavy equipment and simultaneously assures a sufficiently stable foundation or base therefor during the operation thereof. The novel trailer is simple and efficient in operation and economical and durable in construction.

It is an important object of this invention to provide a novel trailer unit adapted to be towed by a truck or tractor whereby heavy equipment or apparatus mounted on the trailer may be transported from location to location.

It is another object of this invention to provide a novel trailer having heavy equipment mounted thereon and which provides a stable foundation or base for the equipment during the operation thereof.

Another object of this invention is to provide a novel trailer for heavy equipment particularly designed and constructed for positioning the equipment substantially at ground level during the operation thereof for increasing the operating efficiency.

Still another object of this invention is to provide a novel trailer for heavy equipment wherein a sufficient elevation is provided therefor to assure road clearance for the trailer during transporting of the equipment.

A further object of this invention is to provide a novel trailer wherein the frame thereof may be quickly and easily raised and lowered with respect to the running gear for facilitating the portability of the equipment mounted thereon.

A still further object of this invention is to provide a novel trailer which is simple and efficient in operation and economical and durable in construction.

Other objects and advantages of the invention will be evident from the following detailed description, read in conjunction with the accompanying drawings, which illustrate my invention.

In the drawings:

FIGURE 1 is a side elevational view of a trailer unit embodying the invention.

FIGURE 2 is a plan view of the trailer unit depicted in FIG. 1.

FIGURE 6 is ar ear perspective view of the trailer unit in a lowered position.

FIGURE 7 is a perspective view of the rear portion of the trailer unit in a raised or elevated position.

FIGURE 8 is a perspective detail view of a portion of the hoisting apparatus utilized with the invention.

Figure 3:
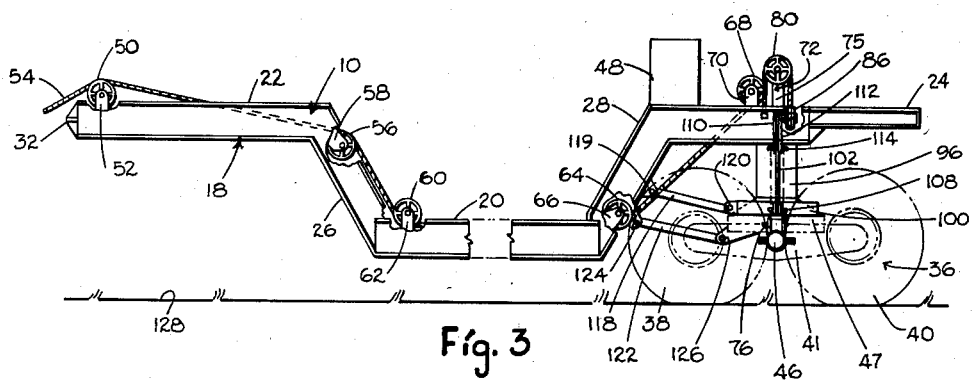
FIGURE 3 is a broken side elevational view of the trailer unit in an elevated position and with portions thereof in dotted lines for purposes of illustration.

Referring to the drawings in detail, reference character 10 generally indicates a trailer unit having suitable heavy apparatus or equipment mounted thereon, such as an engine 12, and pumping units 14 and 16, as is well known. The trailer unit 10 comprises a frame or chassis 18 preferably constructed from suitable transversely spaced structural steel beams having cross members extending therebetween, as is well known, and is provided with a central load carrier portion 20 integral with a front frame portion 22 and a rear frame portion 24. The load carrier or central portion 20 is rigidly connected with the front portion 22 by an angularly disposed frame member 26, and is connected with the rear portion 24 by a similar angularly disposed frame portion 28. The front 22, central 20 and rear portion 24 are mutually parallel and the central portion 20 is disposed at a lower elevation than either the rear or front portion. This assures that a minimum elevation and lowering of the frame 18 will be required for an efficient operation of the trailer unit 10. For example, the overall length of the trailer unit 10 may be approximately forty feet whereas the maximum distance between the central portion 20 and the ground in the elevated position of the chassis 18 will usually not exceed two feet. The entire frame 18 is preferably of a unitary construction whereby the steel beams are welded or otherwise suitably secured together to provide rigidity for the trailer unit 10, and to assure that the entire frame 18 will move as a unit, as will be hereinafter set forth. It is preferable that the upper surfaces of the frame or chassis 18 be provided with a suitable floor plate 30 (FIG. 2) for facilitating the support and mounting of the equipment thereon, as is well known.

The front frame portion 22 is preferably of a smaller transverse dimension than the central portion 20 as clearly shown in FIG. 2, and is elevated with respect to the central portion in order to facilitate connection of the trailer unit 10 with a towing tractor (not shown). The front portion 22 is provided with a forwardly extending centrally disposed apertured flange 32 adapted for cooperation with the king pin connection member (not shown) normally provided on the tractor for securing the trailer unit 10 thereto in any well known manner. The forward portion 22 of the chassis 18 may be utilized for storage of equipment, such as spare tires 34, or the like, if desired.

The rear frame portion 24 is carried or supported by a wheel unit or running gear unit, generally indicated at 36, in a manner as will be hereinafter set forth. The running gear 36 comprises a pair of wheels 38 and 40 interconnected in tandem relation by a suitable chassis 41, and a second pair of oppositely disposed wheels 42 and 44 interconnected in tandem relation by a similar chassis 45. A transversely extending axle 46 and chassis 47 span the distance between the chassis 41 and 45 for connecting the four wheels 38, 40, 42 and 44 as a unit. It will be apparent that the wheels mounted in such a manner provide for a certain amount of independent movement for each wheel, thus facilitating movement of the trailer unit 10 over rough terrain as is often encountered in this type of equipment, and is well known. The rear portion 24 of the frame 18 is preferably of a smaller transverse dimension than the central portion 20 whereby the rear portion 24 may be disposed between the respective wheels 38 and 42, and 40 and 44 in order that the entire frame 18 may be raised and lowered with respect to the running gear 36 as will be hereinafter set forth. Auxiliary equipment, such as a tool box 48, or the like, may be mounted or carried on the rear portion 24, thus increasing the utility of the truck unit 10.

A sheave 50 is journalled on the forward portion 22 and centrally disposed thereon slightly behind the flange 32 by a suitable mounting bracket 52 for receiving a hoisting cable or wire 54 thereover. The cable 54 is secured at one end (not shown) to a winch (not shown) which is normally provided on the towing tractor, as is well known. The cable 54 extends rearwardly from the sheave 50 to a second sheave 56 which is rotatably secured to the angular portion 26 by a suitable mounting bracket 58. The cable passes over the sheave 56 and under a third sheave 60 which is journalled substantially at the juncture of the angular portion 26 and central portion 20 by a bracket 62. From the sheave 60, the cable 54 passes under a fourth sheave 64 which is journalled by a mounting bracket 66 substantially at the juncture of the central portion 20 and the angular portion 28, from whence the cable moves upwardly at an angle to a fifth sheave 68 rotatably secured to the rear portion 24 by an upstanding bracket 70. The sheaves 50, 56, 60, 64 and 68 are disposed in substantial alignment along the longitudinal axis of the trailer frame 18 in order to direct the cable 54 from the tractor winch (not shown) to a fifth wheel hoist apparatus 72 carried by the running gear 36, as will be hereinafter set forth, and extending upwardly through an elongated aperture 74 provided in the floor plate 30 and substantially centrally disposed in the rear portion 24. From an inspection of FIGS. 1 and 2, it will be apparent that the cable 54 is directed over the sheaves 50 and 56 and under the sheaves 60, 64 and 68 whereby the cable 54 will move under the floor plate 30 in the central portion 20 and thus will not interfere in any manner with the equipment mounted on the load carrier portion 20.

The fifth wheel hoist apparatus 72 is preferably similar to that disclosed in the C. Jenkins et al. Patent No. 2,709,087, issued May 24, 1955, and entitled "Truck Trailer With Fifth Wheel Jack." The hoist apparatus 72 comprises an upstanding pipe 75 secured to the axle 46 by a suitable bearing unit 76 and extending upwardly through the chassis 47 and aperture 74. A pair of complementary sheaves 78 and 80 are journalled on a shaft 82 at the upper end of the pipe 75 and are spaced apart by a suitable cable guide bracket 84. The sheaves 78 and 80 are disposed in planes mutually parallel with the plane of the sheave 68, and the sheave 78 is in alignment with the sheave 68 for receiving the cable 54 therefrom.

A sheave 86 (FIG. 8) is disposed adjacent the pipe 75 and spaced below the sheaves 78 and 80. The sheave 86 is journalled on a shaft 90, which in turn is secured to the rear frame portion 24 by suitable supporting members 94. The lower sheave 86 is perpendicular to the plane of the upper sheaves 78 and 80, and receives the cable 54 therefrom. A fastening block 88 is secured to the supporting members 94 and is oppositely disposed from the sheave 86 for receiving from the sheave 80 the free end 92 of the cable 54, which is anchored thereon. The cable 54 may be reeved around the hoisting sheaves in any well known manner whereby movement of the cable in one direction will elevate or raise the sheave 86 and block 88 with respect to the upper sheaves 78 and 80, and the movement of the cable in an opposite direction will lower the sheave 86 and block 88, for a purpose as will be hereinafter set forth. A preferred manner of reeving the cable around the hoisting sheaves, through not limited thereto, is to pass the cable over sheave 78, under sheave 86, and then over sheave 80 for connection to the fastening block 88. It will be apparent that the rear frame portion 24 will be lowered and raised simultaneously with the sheave 86 and block 88, since the sheave and block are connected with the frame 24 through the shaft 90 and support members 94.

Figure 5:
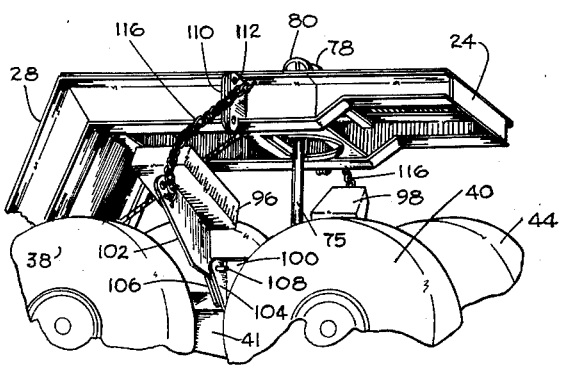
FIGURE 5 is a perspective view of a stabilizing mechanism such as may be utilized with the trailer unit.

Referring to FIG. 5, a pair of oppositely disposed support blocks 96 and 98 are removably secured between the rear frame 24 and the chassis 47 to provide rigidity for the frame in the elevated position thereof, as will be hereinafter set forth. A suitable brace member 100 is secured to each end of the chassis 47 each for receiving one of the blocks 96 and 98 thereon whereby the frame 24 will be securely supported by the blocks. An outwardly extending longitudinal flange 102 is provided on each of the blocks 96 and 98, and is adapted for disposition between a pair of spaced apertured flanges 104 and 106 provided on the brace members 100. A pivot pin 100 extends through the flanges 102, 104 and 106 for pivotally securing the blocks 96 and 98 to the respective brace member 100. A pair of spaced transversely extending apertured flanges 110 and 112 are provided on the opposed sides of the frame portion 24 for receiving the upper portion of the flange 102 therebetween. A removable pin 114 extends through the flanges 110, 112 and 102 for securing the blocks 96 and 98 to the opposed sides of the frame 24. When it is desired to remove the blocks 96 and 98 from the supporting position between the chassis 47 and frame 24, the pins 114 may be removed whereby the blocks may be pivoted outwardly away from the frame 24 around the pivot pins 108. A suitable chain 116 may be secured between each block 96 and 98 and the respective side of the frame 24 for precluding any accidental loss of the blocks in the released position, as shown in FIG. 5.

The running gear 36 may tend to move rearwardly with respect to the frame 18 upon raising and lowering of the frame. In order to preclude this undesirable rearward movement of the running gear, it is preferable to connect the chassis 47 thereof to the frame 18. An arm or bar member 118 is pivotally secured at one end to the angular portion 28 of the frame 18 in any suitable manner, such as a bracket member 119, and the opposite end thereof is pivotally secured to the support member 100 by a bracket 120. A similar arm (not shown) is pivotally connected between the frame portion 28 and the opposite support member 100 in substantial alignment with the arm 118, and suitable bracing members (not shown) may be welded, or the like, between the complementary arms 118 for rigidity, if desired. A second arm or bar 122 is spaced below the first arm 118 and is disposed parallel thereto. The arm 122 is pivotally secured at one end to the angular frame portion 28 by a bracket 124, or the like, and pivotally secured at the opposite end to the chassis 47 by a bracket 126. A similar arm (not shown) to the arm 122 is pivotally secured between the angular frame 28 and the chassis 47 and oppositely disposed from the arm 122, and suitable cross bracing members may be welded, or the like, therebetween for rigidity. In this manner, the chassis 47 of the running gear 36 is secured to the frame 18 for precluding any longitudinal or horizontal movement of the running gear with respect to the frame, and yet permit vertical raising and lowering of the chassis 18 with respect to the running gear 36.

Operation

When it is desired to transport trailer mounted equipment, such as the engine 12 and pumping units 14 and 16, the trailer unit 10 is secured to a suitable tractor (not shown) by connecting the apertured flange 32 with the king pin member (not shown) of the tractor, as is well known. The tractor winch (not shown) may be operated in the usual manner for reeling in the cable 54, or pulling the cable in a forward direction as viewed in FIGS. 1 through 4. The forward pull on the cable is transmitted to the hoisting apparatus 72 whereby the lower sheave 86 and block 88 thereof are moved upwardly in a direction toward the upper sheaves 78 and 80. The upward movement or elevation of the lower sheave 86 and block 88 is transmitted to the rear frame portion 24 through the supporting members 94, thus raising the frame portion 24 upwardly. The frame 18 is of a unitary type construction, as hereinbefore set forth, and when the rear portion 24 thereof has been sufficiently elevated, a continued operation of the cable will elevate the forward portion of the frame or chassis whereby the load carrier portion 20 will be elevated from the ground level 128 to the position depicted in FIGS. 1 and 3. It will be apparent that the elevated position of the frame 18 provides sufficient clearance from the ground 128 for movement of the trailer unit over a highway, or across the terrain of the countryside.

With the frame 18 in the elevated position, it is desirable to provide a support between the rear portion 24 thereof and the chassis 47 of the running gear 36. The support blocks 96 and 98 are manually pivoted inwardly around the pivot pins 108 for positioning the blocks securely on the support members 100 beneath the rear frame 24. The frame 18 may be slightly lowered by letting out the cable 54 whereby the rear frame portion 24 will be disposed on the blocks 96 and 98. The pins 114 are then inserted through the flanges 110, 112 and 102 for securely retaining the blocks 96 and 98 on the frame portion 24, providing support between the frame 24 and the chassis 47. The frame 24 is thus provided with rigidity during movement of the trailer unit 10 along the highway, or the like.

Figure 4:
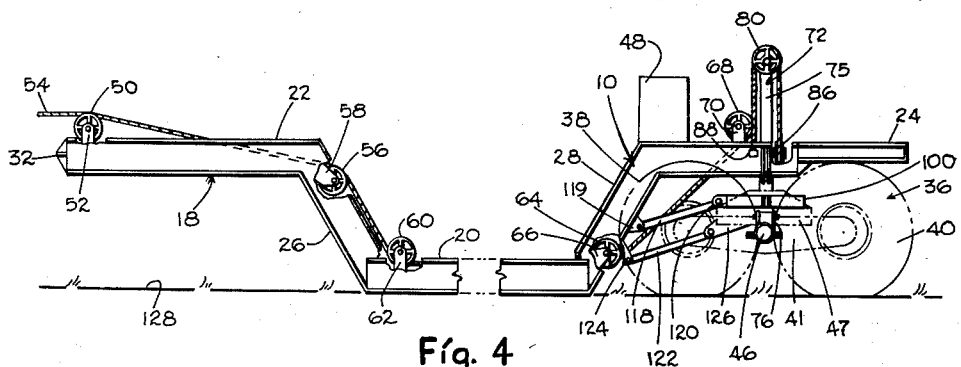
FIGURE 4 is a view similar to FIG. 3 with the trailer in a lowered position.

When the trailer unit 10 has reached the new or different location wherein the equipment thereon is to be utilzed, the frame 18 may be lowered in order that the load carrier portion 20 thereof will be disposed on the ground surface 128 as shown in FIGURE 4. Usually it is preferable that the frame 18 be disconnected from the towing tractor prior to the lowering operation and this general procedure is well known in the industry. As hereinbefore set forth, the cable 54 extends under the forwardly disposed sheave 60 whereby reeling or unreeling of the cable will alternately raise and lower the forward end of the frame or trailer.

Prior to the lowering of the frame 18 the pins 114 are removed for releasing the flanges 102 from engagement from the flanges 110 and 112 and the rear portion of the frame may be slightly raised for lifting thereof from the blocks 96 and 98, thus the blocks 96 and 98 may be manually pivoted outwardly around the pivot pins 108 in a direction away from the frame to the position depicted in FIGURE 5. The chains 116 limit the outward pivotal movement of the blocks and preclude any accidental loss thereof.

The tractor winch (not shown) may then be operated in the usual manner for letting out the cable 54 whereby the hoisting apparatus 72 is operated for lowering the sheave 86 and block 88 with respect to the upper sheaves 76 and 80. The rear frame portion 24 is lowered simultaneously with the sheave 86 and the block 88 through the connection therebetween as hereinbefore set forth. The unitary frame 18 is thus lowered sufficiently for positioning the load carrier portion 20 thereof on the ground level or surface 128. The pipe 75 guides the rear portion 24 in the vertical movement thereof for facilitating the reciprocation of the frame 18.

With the chassis 18 resting on the ground, a stable foundation is provided for the equipment, such as the engine 12 and the pumping units 14 and 16. In addition, the pumping units are disposed at an elevation substantially at ground level for providing an efficient operation thereof in the pumping of drilling fluid, or the like (not shown), from the slush pit (not shown). The parallel bar structure 118 and 122 preclude any rearward movement of the running gear 36 during the lowering or raising operation, and simultaneously permit independent vertical movement of the chassis 18, thus assuring an efficient operation of the trailer unit 10.

As hereinbefore set forth, the frame 18 is of a rigid and unitary construction and is substantially horizontally disposed in both the elevated or lowered position, thus permitting utilization of substantially the entire upper surfaces of the frame for storage or mounting of equipment without the necessity of removal thereof during the operation of the trailer unit 10. Of course, the novel trailer unit 10 may be utilized with substantially any towing tractor (not shown), many of which are provided with tapered tail gate portions whereas many may have a very abrupt tail gate construction. It will be apparent that during the lowering operation, some portion of the central chassis portion 20 may come into contact with the ground surface 128 first, whereupon there may be a slight pivoting of the frame about the contact point. However, it is to be noted that the relatively small distance through which the frame is to be lowered in comparison with the substantially great overall length of the trailer unit results in a very minute arc through which the frame will be pivoted. For example, such an angle of pivot may be measured in fractions of degrees. Thus, the frame is substantially horizontally disposed at all times during the operation thereof.

Conversely, when the trailer is elevated, it may be that some portion of the frame will lift from the ground surface prior to the lifting of the entire structure. In this event, there may be a slight pivoting of the frame about the point of contact with the ground, but here again, the angle through which any pivoting would occur is so slight as to be inconsequential.

From the foregoing, it will be apparent that the present invention provides a novel trailer unit adapted for transporting heavy equipment mounted thereon. The novel trailer unit may be readily lowered to a position adjacent the ground to provide a stable foundation for the operation of the equipment thereon, as well as to provide an efficient disposition of any pumping equipment which may be provided thereon. The trailer unit may be easily elevated sufficiently to provide for road clearance when it is desired to move the equipment thereon to a new or different site. The novel trailer unit is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A trailer unit comprising a frame, a running gear disposed adjacent to the back portion of the frame, a hoisting apparatus carried by the runninng gear and slidably secured to the frame, a plurality of spaced sheaves journalled on the frame and extending longitudinally therealong and including at least one sheave disposed in the forward end portion thereof, a cable carried by the sheaves and operated from a remote position with respect to the frame, said cable extending under the said one sheave in the forward end portion of the frame and around the remaining sheaves and to the hoisting apparatus, said hoisting apparatus being operated by said cable for alternately lowering and raising the frame with respect to the running gear, the frame being substantially horizontally disposed in both the raised and lowered positions thereof, and means carried by the running gear for supporting the frame in the elevated position thereof.

2. A trailer unit comprising a chassis, a running gear, means securing the running gear to the chassis, a plurality of spaced sheaves journaled on the chassis and extending longitudinally therealong and having at least one sheave disposed in the forward portion of the chassis, hoisting means carried by the running gear and extending upwardly through the chassis, means slidably securing the hoisting means to the chassis, a cable operated from a remote position with respect to the frame and extending under the said one sheave and carried by the remaining sheaves and hoisting means whereby the hoisting means is operable for alternately elevating and lowering the chassis with respect to the running gear, said chassis being substantially horizontally disposed in both the fully elevated and completely lowered positions thereof, and support means pivotally secured to the running gear for supporting the chassis in the elevated position thereof.

3. A trailer unit comprising a chassis, a load carrier portion provided on the chassis, a front portion provided on the chassis rigidly connected with the load carrier portion and elevated with respect thereto, a rear portion provided on the chassis rigidly secured to the carrier portion and elevated with respect thereto, a running gear secured to the chassis and disposed below the rear portion of the chassis, hoisting means carried by the running gear and slidably secured to the rear portion of the chassis, sheave means journaled on the chassis and including at least one sheave disposed in the forward portion of the chassis for receiving a cable under the said one sheave and directing the cable to the hoisting means whereby the chassis may be elevated and lowered with respect to the running gear and disposed substantially horizontally in both the elevated and lowered positions thereof, said cable operated from a remote position with respect to the frame, and means cooperating between the running gear and the rear portion for supporting the chassis in the elevated position thereof.

4. A trailer unit comprising a chassis having a central load carrier portion disposed at a lower elevation than the front and rear portions thereof, a running gear disposed below the rear portion of the chassis, means for securing the running gear to the chassis for precluding relatively horizontal movement therebetween, a plurality of spaced aligned sheaves journaled on the chassis and extending therealong and including at least one sheave disposed in the forward portion of the trailer, hoisting means carried by the running gear and slidably secured to the rear portion of the chassis, a cable operated from a remote position with respect to the frame and extending under the said one sheave and carried by the remaining sheaves and hoisting means whereby the chassis may be alternately elevated and lowered with respect to the running gear, said chassis being in a substantially horizontal disposition in both the lowered and elevated position thereof, and pivotal support means carried by the running gear for supporting the chassis in the elevated position thereof.

References Cited in the file of this patent

UNITED STATES PATENTS

| 2,350,841 | Troche | June 6, 1944 |
| 2,653,827 | Manning | Sept. 29, 1953 |
| 2,704,021 | Brundage | Mar. 15, 1955 |
| 2,706,059 | Parker | Apr. 12, 1955 |
| 2,709,087 | Jenkins | May 24, 1955 |
| 2,739,517 | Roberts | Mar. 27, 1956 |
| 2,759,737 | Manning | Aug. 21, 1956 |
| 2,774,604 | Rendel | Dec. 18, 1956 |
| 2,807,381 | Tegeler | Sept. 24, 1957 |
| 2,904,340 | Simpson | Sept. 15, 1959 |